United States Patent [19]
Heinemann et al.

[11] Patent Number: 5,538,743
[45] Date of Patent: Jul. 23, 1996

[54] COMPLETE ANIMAL FOOD FOR CATS AND DOGS

[75] Inventors: Georg Heinemann, Mülheim; Horst Fedder, Geldern, both of Germany

[73] Assignee: Onken GmbH, Moers, Germany

[21] Appl. No.: 327,351

[22] Filed: Oct. 21, 1994

[30] Foreign Application Priority Data

Oct. 22, 1993 [DE] Germany ............. 43 36 050.5

[51] Int. Cl.⁶ .................. A23K 1/18; A23C 9/12; A23L 1/30
[52] U.S. Cl. .................. 426/42; 426/805; 426/72; 426/73; 426/74; 426/580
[58] Field of Search ................. 426/42, 72, 73, 426/74, 580, 805

[56] References Cited

U.S. PATENT DOCUMENTS

| | | | |
|---|---|---|---|
| 3,653,908 | 4/1972 | Buck et al. | 99/2 |
| 4,001,437 | 1/1977 | Jaeggi et al. | 426/43 |
| 4,020,187 | 4/1977 | McCulloch et al. | 426/72 |
| 4,034,115 | 7/1977 | Roberts | 426/43 |
| 4,303,682 | 12/1981 | Guitteny et al. | 426/250 |
| 4,600,588 | 7/1986 | Ernster | 426/42 |

*Primary Examiner*—Esther M. Kepplinger
*Assistant Examiner*—Choon P. Koh
*Attorney, Agent, or Firm*—Herbert Dubno

[57] ABSTRACT

A complete food for dogs and cats contains dairy substances in a significant amount and meat or meat byproducts as well as meat substitutes. The milk solids derive from hydrolyzed fermented milk.

10 Claims, No Drawings

5,538,743

COMPLETE ANIMAL FOOD FOR CATS AND DOGS

FIELD OF THE INVENTION

Our present invention relates to an animal food and, more particularly, to a complete food for dogs and cats.

BACKGROUND OF THE INVENTION

Animal foods, especially for dogs and cats, generally consist of meat byproducts which may or may not be admixed with cereal grains, flavor enhancers and the like. In most cases, however, such foods are not "complete" foods in the sense that they must be supplemented with other food substances and frequently with minerals, substances from food groups which are not included in the prepared food, etc. As a result, the food products do not necessarily satisfy all of the nutritional and physiological needs of the animal.

OBJECTS OF THE INVENTION

It is the principal object of the present invention to provide an animal food and, especially a complete food for cats and dogs which is optimal from the nutritional and physiological points of view.

Another object of this invention is to provide an improved animal food for cats and dogs which will satisfy all of the nutritional needs of the animal, has a texture and form which facilitates injection and renders the product desirable, and which is of low cost.

DESCRIPTION OF THE INVENTION

These objects are attained, in accordance with the invention in an animal food which comprises:

a package;

50 to 95 weight percent of a dairy component consisting predominantly of milk solids in the package; and 5 to 50 weight percent of at least one other component in the package selected from the group which consists of:
  a meat component consisting essentially of comminuted muscle flesh, liver, kidneys and offal,
  a meat-substitute component in the form of a coagulated composition of vegetable matter, milk solids, meat protein and, optionally, fat, and
  mixtures of the meat component and the meat-substitute component.

The result is a complete food for dogs and cats utilizing in major part a dairy component which can satisfy the nutritional and physiological needs. The optimum nutrient composition of the product is guaranteed by the aforedescribed use of several nutrient sources, including milk, meat and other vegetable and animal raw materials. Variable components of milk are used to the maximum in animal nutrition with the instant invention and it appears that there is a synergistic effect due to the combination of proteins from various sources including milk, meat and vegetables to obtain optimum biological values.

In the most general terms, the dairy component is present in an amount of 75% by weight and the other component, i.e. the meat component, the meat substitute component or a combination of the two, is present in an amount of about 25% by weight in the composition.

The dairy component can consist of:

62 to 95 weight percent of hydrolyzed fermented milk formed by fermentation with fermentation bacteria;

up to 10 weight percent of at least one vegetable oil;

up to 10 weight percent of at least one vegetable protein;

up to 10 weight percent of at least one vegetable carbohydrate;

up to 5 weight percent of at least one stabilizer; and up to 3 weight percent of at least one vitamin and mineral blend.

Preferably the dairy component consists substantially of:

85 weight percent of the hydrolyzed fermented milk, at least 2.5 weight percent of soybean oil as the vegetable oil, at least 2.5 weight percent of soybean isolate as the vegetable protein, and 3.5 weight percent rice flour or wheat flour as the vegetable carbohydrate.

The dairy component preferably contains 0.7 weight percent of such stabilizers and preferably 1 weight percent of the vitamin and mineral blends, the balance can be any of the listed ingredients of dairy component if the balance is not made up of additional substances as listed below.

Lactose is split into monosaccharides when milk is hydrolyzed and can therefore be digested by animals. Due to the selection of fermentation bacteria, the final product is given an optimum flavor. Preferably fermentation bacteria of *lactobacillus bulgaricus*, and/or *streptococcus acidophilus* and/or bifido bacteria strains should be used in a ratio of 25:75, preferably 50:50 of any two of the above mentioned strains.

Furthermore, the following additional substances can be added to the dairy substance in amounts totaling the aforementioned balance:

Amino acid blends,

Acidifiers such as D-malic acid, L-malic acid, citric acid, D-lactic acid, or L-lactic acid, Ballast such as cellulose, Minerals such as potassium, calcium, sodium, phosphorus, Vitamins such as A, D, B1, B2, B6, B12, E and trace elements such as iron, manganese, copper, zinc totalling approximately 0.5 to 2 weight percent.

Should a meat substitute be used, this meat substitute should consist of the following components:

5 to 55 weight %, preferably 40 weight % of hydrolyzed fermented milk, 0 to 10 weight %, preferably 5 weight %, of vegetable oil, such as soybean oil, 0 to 20 weight %, preferably 9 weight %, of vegetable protein, such as soybean flour, 10 to 60 weight % preferably 47 weight % of animal protein, poultry liver or beef liver, 0 to 10 weight %, preferably 4 weight %, of animal fat, such as suet and/or poultry fat and/or dairy fat, 0 to 20 weight %, preferably 10 weight % of flour, such as rice flour or wheat flour.

Furthermore, the meat substitute should preferably include additions such as flavor enhancers, i.e. meat extracts and/or protein hydrolyzates and/or reducing sugars such as dextrose or xylose and acidity regulators such as acidifiers and emulsifiers i.e. pyrophosphates and/or lecithin totalling 0.5 to 2 weight percent.

According to the invention, a process for making the animal food of the invention which consist of:

a package;

50 to 95 weight percent of a dairy component consisting predominantly of milk solids in the package; and 5 to 50 weight percent of at least one other component in the package selected from the group which consists of:
   a meat component consisting essentially of comminuted muscle flesh, liver, kidneys and offal, a meat-substitute component in the form of a coagulated composition of vegetable matter, milk solids, meat protein and, optionally, fat, and
   mixtures of the meat component and the meat-substitute component, can comprise coagulating the meat substitute component by subjecting the meat substitute component to direct steam pressurization to form a pasty substance, cutting the pasty substance into pieces, mixing the pieces of pasty substance with the dairy component to form a mixture, filling the mixture into the package and sterilizing the package.

The meat or offal are blended after cutting with the dairy substance in the composition of the invention and the blend is filled into a sterilizable outer wrapping and is sterilized.

Within the scope of the invention, however, separate filling of the dairy substance and the meat and/or meat substitutes in two-chamber outer wrappings is possible.

Furthermore, the invention provides that any lactose available in the milk, used for producing the dairy substance, is reduced by hydrolysis to a residual amount of maximum 0.2 weight percent of lactose and that milk processed in this way is mixed with fermentation bacteria and fermented to a pH value of pH 5 to pH 4.2, preferably 4.5. Hydrolysis will best be performed close to a pH-neutral range between pH 6.5 to pH 6.8 at a temperature of 35° to 44° C. Preferred fermentation bacteria are yogurt bacteria and milk yogurt bacteria.

SPECIFIC EXAMPLE

A meat-substitute component is prepared by first hydrolyzing milk to a maximum of 0.5% lactose and then fermenting the milk to a pH value of 5 to 4.6, preferably 4.5, the hydrolysis being effected at a pH between 6.5 and 6.8 at a temperature of 35° to 44° C. 35% by weight of the thus hydrolyzed fermented milk is combined with 5% by weight soy bean oil, 4% by weight soy bean flour, 42% by weight of ground animal byproducts, including poultry liver and beef liver, 4% by weight of equal parts of suet, poultry fat and dairy fat and 10% by weight of equal parts of rice flour and wheat flour.

That blend is subjected to direct steam pressurization and coagulated, the coagulated pasty substance being cut up pieces and combined with about 1% of flour enhancers, dextrose, pyrophosphates and/or lecithin and meat extract as flavor enhancer if desired. The result is the meat substitute component.

The meat component is prepared by grinding offal and meat byproducts from beef including liver, kidneys and intestines.

The dairy substance is prepared by hydrolyzing milk as described and then fermenting the milk with a 50:50 mixture of *lactobacillus, bulgaricus* and *streptococcus acidophilus* to a pH between 5 to 4.6, preferably 4.5.

85% by weight of the thus fermented hydrolyzed milk is blended with 2.5 % by weight soy bean oil, 2.5 % by weight soy bean isolate, 3.5% by weight of a mixture of equal parts of rice flour and wheat flour, 0.7% by weight of stabilizers and 1% by weight of vitamin and mineral blends containing all of the vitamins and minerals mentioned previously. The balance was made up from cellulose filler.

The animal food was produced by combining 75% by weight of this dairy component with 12.5% by weight of the meat component and 12.5% by weight of the meat substitute component, mixed, introduced into sterilizable plastic bags, sealed and sterilized.

We claim:

1. A complete animal feed for dogs and cats comprising:
   a package and a food product in the package, the food product being composed of
   about 75 weight percent of a dairy component and about 25 weight percent of a meat or meat substitute component, said dairy component consisting essentially of:
      about 75 weight percent of hydrolyzed fermented milk formed by fermentation with fermentation bacteria, said hydrolyzed fermented milk having a maximum of 0.5 weight percent lactose;
      about 2.5 weight percent of at least one vegetable oil;
      about 2.5 weight percent of at least one vegetable protein;
      about 3.5 weight percent of at least one vegetable carbohydrate;
      up to 5 weight percent of at least one stabilizer; and
      up to 3 weight percent of at least one vitamin and mineral blend;
   said meat and meat-substitute component consisting essentially of comminuted muscle flesh, liver, kidneys, and offal, a meat substitute in the form of a coagulated composition of vegetable matter, milk solids, meat protein, and optionally fat; and mixtures of meat and said meat substitute, the meat substitute consisting essentially of:

5 to 55 weight % of hydrolyzed fermented milk;

up to 10 weight % of at least one vegetable oil;

up to 20 weight % of at least one vegetable protein;

10 to 60 weight % of at least one animal protein;

up to 10 weight % of at least one animal fat; and up to 20 weight % of at least one flour.

2. The animal feed defined in claim 1 wherein the maximum lactose content in the hydrolyzed, fermented milk is 0.2 weight percent.

3. The animal feed defined in claim 1 wherein said hydrolyzed fermented milk is milk fermented with at least one fermentation bacteria selected from the group which consists of lactobacillus bulgaricus, streptococcus acidophilus, and bifido bacteria strains.

4. The animal feed defined in claim 3 wherein at least two of the strains of bacteria are utilized in the fermentation of the milk in a ratio of 25 to 75:75 to 25.

5. The animal feed defined in claim 4 wherein said ratio is about 50:50.

6. The animal feed defined in claim 1 wherein said dairy component includes in a vitamin and mineral blend: potassium, calcium, sodium, phosphorus, iron, manganese, copper and zinc, and Vitamins A, D, B1, B2, B6, B12 and E, said dairy component further comprising at least one additional substance selected from the group consisting of:
   an amino acid blend;
   acidifiers selected from the group consisting of D-malic acid, L-malic acid, D-lactic acid, L-lactic acid, and citric acid, and
   a filler including cellulose, all in an amount approximately 0.5 to 2 weight % of the dairy component.

7. The animal feed defined in claim 1 wherein in said meat-substitute component:

said hydrolyzed fermented milk is present in an amount of about 40 weight %;

said vegetable oil is present in an amount of about 5 by weight soybean oil;

said vegetable protein is present as soybean flour in an amount of 9% by weight;

said animal protein, poultry liver, or beef liver is present in an amount of 47% by weight;

said animal fat is at least one animal fat selected from the group which consists of suet, poultry fat, and dairy fat in an amount of 4% by weight; or said flour is rice flour or wheat flour and is present in an amount of 10% by weight.

8. The animal feed defined in claim 7 wherein said meat-substitute component further comprises an amount between 0.5 and 2 weight % of at least one flavor enhancer including a meat extract, at least one protein hydrolysate, at least one reducing sugar selected from the group consisting of dextrose and xylose, at least one acidity regulator in the form of an acidifier, and at least one emulsifier in the form of a pyrophosphate or lecithin.

9. The animal feed defined in claim 1 wherein lactose in the milk used to produce said dairy component is reduced by hydrolysis at a pH of 6.5 to 6.8 and a temperature of 35° C. to 44° C. to a maximum of 0.5 weight % lactose and the milk thus treated is mixed with yogurt bacteria or mild yogurt bacteria and is fermented to a pH of 4.5.

10. An animal feed comprising:
   (a) a package;
   (b) about 75 weight percent of a diary component in said package consisting essentially of:
   about 85 weight percent of hydrolyzed, fermented milk formed by hydrolysis at a pH of 6.5 to 6.8 at a temperature of 35° to 44° C., followed by fermentation with fermentation bacteria at a pH of 4.5 to 5, said hydrolyzed, fermented milk having a maximum of 0.5 weight percent lactose;
   about 2.5 weight percent soybean oil as a vegetable oil;
   about 2.5 weight percent soybean isolate as a vegetable protein; and
   about 3.5 weight percent of a mixture of equal parts of rice flour and wheat flour as a vegetable carbohydrate;
   (c) about 12.5 weight percent of a meat substitute component in said package consisting essentially of comminuted muscle flesh, liver, kidneys, and offal; and
   (d) about 12.5 weight percent of a meat substitute component in said package consisting essentially of;
   about 40 weight percent of the hydrolyzed, fermented milk;
   about 5 weight percent of soybean oil as a vegetable oil;
   about 9 weight percent of soybean flour as a vegetable protein;
   about 47 weight percent of at least one animal protein selected from the group consisting of poultry liver and beef liver;
   about 4 weight percent of at least one animal fat selected from the group consisting of suet, poultry fat and dairy fat; and
   about 10 weight percent of at least one flour selected from the group consisting of rice flour and wheat flour.

\* \* \* \* \*